United States Patent [19]

Walles et al.

[11] Patent Number: 5,064,882

[45] Date of Patent: Nov. 12, 1991

[54] ENCAPSULATION METHOD, MICROELECTRONIC DEVICES MADE THEREFROM, AND HEAT CURABLE COMPOSITIONS BASED ON EPOXY RESINS, DIARLIODONIUM-HEXAFLUOROANTI-MONATE SALTS AND FREE RADICAL GENERATORS

[75] Inventors: Erik W. Walles, Rensselaer; John H. Lupinski, Scotia; James V. Crivello, Clifton Park, all of N.Y.

[73] Assignee: General Electric Company, Schenectady, N.Y.

[21] Appl. No.: 645,778

[22] Filed: Jan. 25, 1991

Related U.S. Application Data

[62] Division of Ser. No. 386,670, Jul. 31, 1989, Pat. No. 5,015,675.

[51] Int. Cl.$^5$ ............................................. H01L 23/28

[52] U.S. Cl. ........................................ 523/443; 357/72; 523/466; 525/481; 525/482; 525/485; 525/506; 528/92; 528/102

[58] Field of Search .................. 357/72; 523/443, 466; 525/481, 482, 485, 506; 528/92, 102

[56] References Cited

U.S. PATENT DOCUMENTS 4,123,551 11/1979 Crivello ............................. 528/355
4,845,159 2/1989 Chao ................................... 525/506

*Primary Examiner*—John Kight, III
*Assistant Examiner*—Frederick Krass
*Attorney, Agent, or Firm*—William A. Teoli; James C. Davis, Jr.; William H. Pittman

[57] ABSTRACT

A heat curable composition is provided which is useful for encapsulating microelectronic devices using a heat curable epoxy composition having a diaryliodonium hexafluoroantimonate salt as a catalyst in combination with an effective amount of a free radical generating aromatic compound as a cocatalyst.

1 Claim, No Drawings

ENCAPSULATION METHOD, MICROELECTRONIC DEVICES MADE THEREFROM, AND HEAT CURABLE COMPOSITIONS BASED ON EPOXY RESINS, DIARLIODONIUM-HEXAFLUOROANTIMONATE SALTS AND FREE RADICAL GENERATORS

This application is a division of application Ser. No. 07/386,670, filed 07/31/89 now U.S. Pat. No. 5,015,675.

CROSS REFERENCE TO RELATED APPLICATIONS

Reference is made to the co-pending application of Walles, et al, Ser. No. 103,153, filed 10/1/87, and Crivello et al, Ser. No. 171,063, filed Mar. 21, 1988, where both applications are assigned to the same assignee as the present invention and incorporated herein by reference.

BACKGROUND OF THE INVENTION

Prior to the present invention, commercially available plastic encapsulants for electronic devices had several serious disadvantages. One disadvantage, for example, was that prior to use, the encapsulant required refrigeration, preferably to 4° C. and protection from moisture during shipment and storage. Unless the encapsulant composition was refrigerated and protected from moisture, it did not provide suitable flow length for filling multicavity molds. Encapsulant molding powders are generally sealed inside several plastic bags and surrounded by dry ice before shipment by the manufacturer. As a result, the material must be allowed several hours to reach room temperature in the absence of moisture before it is used to encapsulate an electronic device to minimize a build-up of water in the powder due to atmospheric condensation.

Although flow length during injection molding is an important consideration for qualifying commercially available curable polymeric materials for device encapsulation, another equally important requirement of the electronic system manufacturers is that after cure, the plastic encapsulated electronic device must have the ability to resist changes in humidity conditions over a wide temperature range. One way to test the resistance of plastic encapsulated electronic devices to high humidity over various temperature ranges, such as experienced in South East Asia, is by using the "HAST" test (highly accelerated stress test) as discussed by L. Gallace et al. in "Reliability of Plastic-Encapsulated Integrated Circuits and Moisture Environments", RCA Review, Vol. 45. (June 1984) pages 249-277. Another version of the HAST is shown by K. Ogawa et al., Automatically Controlled 2-Vessel Pressure-Cooker Test - Equipment IEEE Transactions on Reliability, Vol. R-32, No. 2 (June 1983). The HAST test determines how long circuitry of a plastic encapsulated device will survive while subjected to 18 volts during exposure to 85%RH, 145° C. corresponding to 2.7 atmospheres of steam. The devices are periodically tested with a GenRad model 1731/linear IC tester having internal diagnostics and system calibration.

An additional consideration which must be addressed by encapsulant composition manufacturers for the electronic industry is the cure temperature required for commercially available encapsulants which are usually epoxy resin formulations. It is generally known that presently available encapsulants which are injection molded onto electronic devices require a temperature of at least 180° C. Such temperatures often create excessive stresses at the interface of the cured plastic encapsulant and the electronic device upon cooling.

In order to minimize the cracking of silicon chips resulting from 180° C. plastic encapsulation, silicone resin modified epoxy resins have been used as encapsulants, as shown by K. Kuwata et al., IEEE, 1985 (18-22).

An additional concern of the electronic systems manufacturers is that plastic encapsulated electronic devices requiring soldering often fail because the heat distortion temperature (HDT) of the cured encapsulant is often too low, i.e. between about 200° C. to 250° C. The molded encapsulant can experience a change in shape (distortion), when the device is dipped into a molten solder bath. Temperatures up to 290° C. are sometimes unavoidable in instances where solder fluxes which are often used to facilitate metal contact cannot be tolerated.

It would be desirable, therefore, to provide less stressful encapsulating compositions curable at temperatures significantly below 180° C., which have HDTs after cure exceeding 300° C. Encapsulated devices fabricated from such encapsulants would have substantially reduced stress due to decreased thermal expansion. In addition, such encapsulated devices could be made with surface areas exceeding ¼ sq.in., without cracking. It also would be desirable to have encapsulated electronic devices having greater than a 50% survival rate when subjected to HAST test conditions measuring reliability in moisture environments when compared to current commercial devices.

In copending application Ser. No. 103,153, a significant improvement in the shelf stability of microelectronic device encapsulating compositions was achieved by employing as the cure catalyst, a diaryliodonium hexafluoroantimonate salt and a copper compound as a cocatalyst. The iodonium catalyst was used in combination with a substantially chloride-free epoxy resin and a fused silica filler to provide a superior silicon chip encapsulating composition. The resulting encapsulants are able to provide field electronic devices having HDTs from about 250° C. to 345° C., and reduced incidence of cracking. The encapsulated devices are also found to be able to far exceed the 100 hrs 50% survival rate at about 145° C. under the aforementioned HAST test conditions which represent the current state of the art devices. Although the iodonium salt catalyzed epoxy system provides excellent results, copper acetyl-acetonate, a preferred copper cocatalyst, was found to be nearly insoluble in the resin at ambient temperatures. In addition, at elevated temperatures, the copper cocatalyst was also found to catalyze the decomposition of a brominated epoxy resin which was used in the heat curable encapsulant as a flame retardant. The decomposition of the brominated epoxy resin often results in the formation of bromide ions which are known to catalyze the corrosion of aluminum. The corrosion of the aluminum leads of the encapsulated integrated circuit device can result in reduced performance life.

SUMMARY OF THE INVENTION

The present invention is based on the discovery that copper salts, such as copper acetylacetonate, which are used as cocatalysts for the diaryliodoniumhexafluoroantimonate catalysts can be replaced by an aromatic free-radical precursor, such as benzopinacol. The resulting epoxy encapsulant composition has been found to exceed the performance shown by the heat curable compositions of Ser. No. 103,153. It has been further discovered, that optimum performance can be achieved if the substantially chloride-free epoxy resin used in Ser. No. 103,153, is replaced with a metabromophenol containing epoxy resin having less than 100 parts per million of hydrolyzable chloride.

STATEMENT OF THE INVENTION

There is provided by the present invention, a heat curable composition comprising by weight, (a) 100 parts of an epoxy resin having less than 100 parts per million of hydrolyzable chloride, (b) 10 to 1000 parts of fused silica filler, (c) a catalytic amount of a compatible monomeric, or polymeric diaryliodonium hexafluoroantimonate salt, and (d) an effective amount of a free-radical generating aromatic compound as a cocatalyst for (c).

Epoxy resins which can be utilized in the heat curable compositions of the present invention are, for example, Quatrex epoxy resins, such as Quatrex 2410 manufactured by the Dow Chemical Company, Midland, Mich. Additional epoxy resins which can be used are any epoxy resins having a hydrolyzable total chloride content of less than about 100 ppm. These epoxy resins can be in the form of a flaked solid epoxy novolak resin having a $T_g$ from about 10°–25° C. Additional epoxy resins which can be used are shown, for example, in Plastic Focus, Vol. 16, No. 40 (Nov. 26, 1984) and certain substantially chloride-free epoxy resins shown by Shinohara et al., U.S. Pat. No. 4,358,552, incorporated herein by reference.

Further examples of the epoxy resins which can be used in the practice of the present invention are shown in Chemical Week (Nov. 28, 1984) pages 13–14.

Additional epoxy resins which can be utilized in the heat curable compositions of the present invention and which are preferred, are meta-bromophenol containing epoxy resins described in the Proceedings of the Division of Polymeric Materials: Science and Engineering, American Chemical Society, pages 763–773, by C. S. Wang, D. B. Fritz and A. Mendoza which is incorporated herein by reference.

The fused silica filler which can be used in the practice of the present invention is preferably made by the fusion of a crystalline quartz. A description of alpha crystalline quartz can be found on pages 818–825 of Vol 20, Third Edition of Kirk Othmer Encyclopedia, which is incorporated herein by reference. Fused silica filler which can be utilized in the practice of the present invention also can be found in Handbook of Fillers and Reinforcements for Plastics, Harry S. Katz et al., Van Nostrand Reinhold Company, New York (1978) pages 155–158, which is incorporated herein by reference. A preferred form of the fused silica filler is shown by the Glass Grain GP series manufactured by Harbison-Walker Refractories, North American Operations, Dresser Industries, Inc., One Gateway Center, Pittsburgh, Pa. 15222. Typical properties of the preferred fused silica which can be used in the practice of the present invention are as follows:

| | |
|---|---|
| SiO$_2$ | 99.6% |
| Al$_2$O$_3$ | 0.2 |
| Fe$_2$O$_3$ | 0.05 |

-continued

| | |
|---|---|
| Na$_2$O | 0.005 |
| K$_2$O | 0.006 |

Specific Gravity: 2.2
Coefficient of Linear Thermal Expansion: $0.4 \times 10^{-6}$ in/in/°F.
Crystal Species: Amorphous
Particle Size Distribution: (Sedigraph)

| | % Finer Than | | |
|---|---|---|---|
| Micron | GP111 | GP71 | GP31 |
| 70 | 99 | | |
| 60 | 98 | | |
| 50 | 95 | | |
| 40 | 90 | 99 | 99 |
| 30 | 77 | 94 | 97 |
| 20 | 58 | 77 | 91 |
| 10 | 33 | 45 | 73 |
| 6 | 15 | 28 | 57 |
| 4 | 4 | 12 | 46 |
| 2 | 1 | 5 | 29 |

| U.S. Screens (Cumulative % Retained) | |
|---|---|
| | GP111 |
| 100 Mesh | 0.1% |
| 200 Mesh | 5.0 |
| 325 Mesh | 23.0 |
| Passing 325 Mesh | 77.0 |

High purity fused silica from tetraethyl orthosilicate using NH or OH as a gelation catalyst also can be used. The dried gels can be crushed into a powder.

The diaryliodonium hexafluoroantimonate salts of the present invention are preferably compounds included within the formula, $$[RIR^1]^+[SbF_6]^-, \quad (1)$$

where R and R$^1$ are selected from the same or different C$_{(6-14)}$ monovalent aromatic hydrocarbon radicals substituted with one or more radicals substantially inert under encapsulation conditions.

Many of the preferred salts of formula (1) are the non-toxic diaryliodonium salts having R or R$^1$ radicals substituted with C$_{(8-18)}$ alkoxy radicals shown by Crivello et al, Ser. No. 171,063, filed Mar. 21, 1988, which is incorporated herein by reference.

The diaryliodonium antimonate salts of the present invention, also can include polymeric diaryliodonium salts comprising at least 0.01 mol percent of chemically combined divalent units selected from,

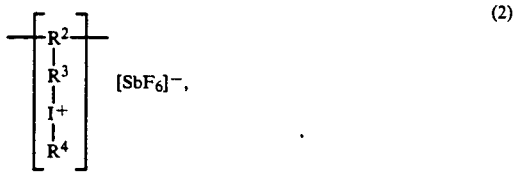

(2)

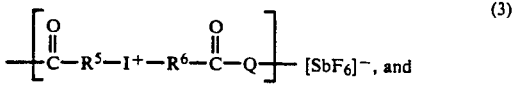

(3)

and

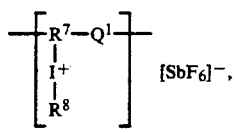

where $R^2$ is a trivalent $C_{(2-8)}$ alkylene or branched alkylene group, which can be substituted with one or more radicals inert during encapsulation, $R^3$, $R^5$ and $R^6$ are selected from $C_{(6-14)}$ divalent arylene groups which can be substituted with one or more radicals inert during encapsulation, $R^7$ is selected from trivalent $C_{(6-14)}$ aryl groups which can be substituted with one or more radicals inert during encapsulation, $R^4$ and $R^8$ are $C_{(6-14)}$ monovalent aryl groups which can be substituted with one or more radicals inert during encapsulation, Q is an ester or amide linkage and $Q^1$ is methylene or —O—, and when $Q^1$ is methylene, $R^7$ is substituted with —$OR^9$, where $R^9$ is $C_{(1-14)}$ monovalent hydrocarbon group, or monovalent hydrocarbon group substituted with one or more radicals inert during encapsulation.

Diaryliodonium antimonate salts which are included within formula (1) are, for example,

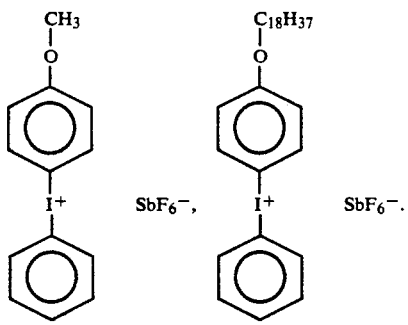

Among the polymeric diaryliodonium salts having chemically combined units of formula (2), there are included

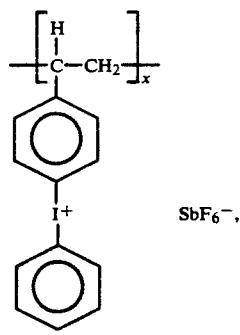

where x is an integer having a value of at least 5.

The preferred polymeric diaryliodonium salts shown by formulas (3) and (4), for example,

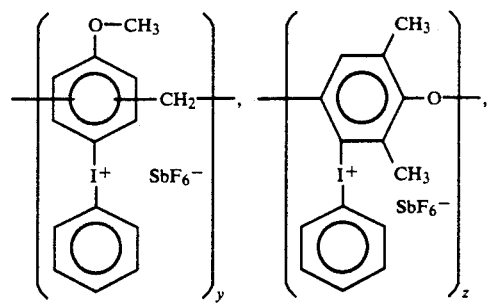

where y and z are integers having a value of at least 5. Monovalent aromatic hydrocarbon radicals which are included within R and $R^1$ are, for example: phenyl, tolyl, xylyl, naphthyl, anthryl; $C_{(1-18)}$ alkoxy substituted $C_{(6-14)}$ aromatic organic radicals such as methoxy substituted phenyl, octyloxy substituted tolyl. Radicals included within $R^2$ are, for example, ethylidene, and propylidene. Radicals included within $R^4$ and $R^8$ are the same as R and $R^1$. Radicals included within $R^3$, $R^5$, and $R^6$ are divalent aromatic radicals such as phenylene, tolylene, xylylene and naphthylene. Radicals included with $R^7$ are for example,

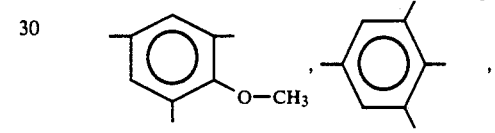

Aromatic free-radical generating compounds which can be used as cocatalysts in combination with the diaryliodonium hexafluoroantimonate salts of formulas (1-4) are, for example, aromatic pinacols, such as benzopinacol which is preferred. In addition, other free-radical aromatic generating compounds can be used, such as benzoinalkyl ethers, e.g.

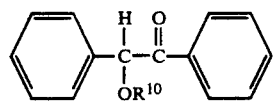

where $R^{10}$ is a $C_{(1-4)}$ organic radical selected from alkyl radicals and aryl radicals; $R^{10}$ also can be a $C_{(1-14)}$ silylorgano radical; high temperature organic peroxides having half-lives at 100° C. of about 10 hours and about 1 minute at temperatures of about 150° C. to 200° C., such as dicumylperoxide, a a'-bis(t-butylperoxy) diisopropylbenzene, t-butylperbenzoate; silylethers of aromatic pinacols and diaryldisulfides, such as diphenyldisulfide also are effective.

A catalytic amount of onium salt of formulas (1-4) is that amount of onium salt sufficient to provide from about 0.01 to 100 mg of antimony, per gram of epoxy resin. An effective amount of the free-radical generating cocatalyst which can be used as a cocatalyst in combination with the onium salt of formulas (1-4) is from 0.01 to 3 parts by weight of the free-radical precursor compound, and preferably 0.3 to 0.8 part, per part of onium salt.

In the practice of the invention for making the encapsulation composition, the onium salt, which hereinafter means the monomeric or polymeric onium salt of formulas (1-4), or mixtures thereof, and the free-radical generating compound is initially blended with the fused silica. There can be utilized during the blending of the onium salt and fused silica, additives, such as carnauba wax at from 0.01 to 5%, based on the weight of encapsulating composition; additional additives, such as antimony trioxide, and carbon black also can be used. The various ingredients can be placed in a Henschel mixer to provide more intensive blending.

The resulting onium salt/fused silica mixture then can be blended with the epoxy resin. A two-roll mill can be used in accordance with standard procedures to produce the encapsulation composition.

In order that those skilled in the art will be better able to practice the invention, the following examples are given by way of illustration and not by way of limitation. All parts are by weight unless otherwise indicated.

EXAMPLE 1

Onium salt catalyzed encapsulant was made using Quatrex 2410 epoxy having 25 ppm of chloride, and Quatrex 6410 a brominated epoxy resin useful as a stabilizer having less than 150 ppm of chloride. These epoxy resins are manufactured by the Dow Chemical Company. In addition, there was used GP11I and GP7I, fused quartz fillers manufactured by Harbison Walker Refactories of Pittsburgh, Pa. These fused quartz fillers had an average particle size of less then 40 microns and less than 90 microns respectfully. Phenyl(octyloxyphenyl)iodonium hexafluoroantimonate "octyloxy onium salt" was also used in combination with either copper acetyl-acetonate or benzopinacol.

The various ingredients were blended, using a rotary blender, then two-roll milled at 85° C. for 5 minutes. After cooling to room temperature, the resulting material was ground sufficiently to pass through a ⅛th inch diameter screen. The Quatrex 2410 and Quatrex 6410 were added during the milling step to prevent the blender from seizing. The blending was carried out for 1 minute at 1800 rpm and for 1 minute at 3600 rpm. The following shows the various ingredients used in the mixture which was blended.

TABLE I

| | Weight Percent | | | |
|---|---|---|---|---|
| Material | 1 | 2 | 3 | 4 |
| 1. Quartrex 2410 | 27.62 | 27.58 | 27.55 | 27.53 |
| 2. GP11I | 33.79 | 33.73 | 33.70 | 33.66 |
| 3. GP7I | 34.25 | 34.20 | 34.32 | 34.12 |
| 4. Octyloxy Onium Salt | .30 | .30 | .30 | .30 |
| 5. Benzopinacol | .15 | .30 | .40 | .50 |
| 6. Carnauba Wax | .39 | .39 | .39 | .39 |
| 7. Quatrex 6410 | 1.92 | 1.92 | 1.92 | 1.92 |
| 8. Antimony Oxide | 1.45 | 1.45 | 1.45 | 1.45 |

TABLE I-continued

| | Weight Percent | | | |
|---|---|---|---|---|
| Material | 1 | 2 | 3 | 4 |
| 9. Carbon Black | .13 | .13 | .13 | .13 |
| | 100.00 | 100.00 | 100.00 | 100.00 |

The above compositions were molded at 180° C., 1000 psi and at 150° C., 1000 psi to determine their flow characteristics. In addition, cure times in seconds at 180° C. and 150° C. as well as shore D hot hardness at 180° C. and 150° C. were measured. A commercial encapsulant, MP130 of the Nitto Chemical Company and the encapsulant from copending application Ser. No. 103,153 using copper acetylacetonate or "copper salt" was also measured. The following results were obtained.

TABLE II

| | Molding Characteristics of Encapsulants | | | | | |
|---|---|---|---|---|---|---|
| Test | 1 | 2 | 3 | 4 | Copper Salt | MP130 |
| Flow; 180° C., 1000 psi* | 24" | 19" | 14" | 11" | 19" | 25" |
| Flow; 150° C., 1000 psi | 43" | 35" | 30" | 23" | 24" | 23" |
| Hot Plate Cure Time | | | | | | |
| seconds at 180° C. | 8 | 7 | 7 | 7 | 11 | 19 |
| seconds at 150° C. | 48 | 40 | 34 | 29 | 30 | 85 |
| Shore D Hot Hardness** | | | | | | |
| (1.5 min, 180° C.) | 97 | 97 | 97 | 98 | 85 | 95 |
| (2.0 min, 150° C.) | 75 | 88 | 93 | 96 | 65 | 65 |

*ASTM D3123
**ASTM D2240

The above results show that the compositions of the present invention provide the best flow lengths. The hot hardness values for the compositions of the present invention are much better than those for Ser. No. 103,153 (copper salt) and MP130. In addition, the above data show that the flow length is linearly related to the benzopinacol level.

Thermal properties (TMA) of the various materials was then determined (TMA) for pellets molded 2 minutes at 180° C. and post-baked 16 hours at 180° C. The following results were obtained.

TABLE III

| | 1 | 2 | 3 | 4 | Copper Salt | MP130 |
|---|---|---|---|---|---|---|
| Tg, °C. | 195 | 194 | 195 | 195 | 176 | 179 |
| alpha at 50° C. | 19 | 20 | 22 | 25 | 21 | 19 |
| alpha at 150° C. | 33 | 30 | 34 | 37 | 33 | 27 |
| alpha at 180° C. | 36 | 33 | 36 | 38 | 39 | 35 |
| alpha at 220° C. | 47 | 44 | 46 | 48 | 51 | 65 |

The above results show that the glass transition temperatures of the compositions of the present invention containing benzopinacol as the cocatalyst for the iodonium salt catalyst was significantly higher than the compositions of either the encapsulant composition of Ser. No. 103,153 containing the copper salt cocatalyst or MP130. As a result, the benzopinacol containing encapsulants had expansion coefficients which were reproducibly lower as compared to the MP130 or the acetylacetonate cocatalyst composition.

EXAMPLE 2

Encapsulant compositions were prepared in accordance with the procedure of Example 1. An additional encapsulant composition was prepared using the preferred meta-bromophenol containing epoxy resin, or "brominated epoxy novolac" in place of Quatrex 2410 and Quatrex 6410. The following Table shows the various encapsulant compositions which were prepared where CuAcAc is copper acetylacetonate.

TABLE IV

|  | 5 | 6 | 7 |
|---|---|---|---|
| Brominated Epoxy Novolac | — | — | 29.61 |
| Quatrex 2410 | 27.62 | 27.66 | — |
| GP11-I | 33.78 | 33.78 | 33.76 |
| GP7-I | 34.25 | 34.25 | 34.21 |
| Iodonium Catalyst | .30 | .30 | .30 |
| CuAcAc | — | .10 | — |
| Benzopinacol | .15 | — | .14 |
| Carnauba Wax | .39 | .39 | .39 |
| Sb$_2$O$_3$ | 1.45 | 1.45 | 1.46 |
| Carbon Black | .13 | .13 | .13 |
| Quatrex 6410 | 1.93 | 1.93 | — |

Above compositions were then used to encapsulate CA324 operational amplifiers (4 amplifiers/chip) at 180° C. and 1000 psi for two minutes. After clipping and trimming, the devices were post baked for 16 hours at 180° C. The various encapsulated devices were tested in a linear IC tester to select samples of 10 units each for accelerated life testing in a pressure vessel at 145° C., 85% relative humidity (RH) corresponding 2.7 atmospheres of steam. Each device was biased at 18 volts. Periodically, the samples were taken from the pressure vessel and after cooling to room temperature, they were screened with the IC tester. The following results were obtained where "Hrs. to Failure" means the duration in hours before failure was indicated by the IC tester.

TABLE V

| Hrs. to Failure | Failed Devices | | |
|---|---|---|---|
|  | 5 | 6 | 7 |
| 150 | 0 | 0 | 1 |
| 290 | 0 | " | 2 |
| 422 | 3 | " | ↑ |
| 490 | " | 1 | ↑ |
| 554 | 3 | 2 | ↑ |
| 613 | 5 | 5 | ↑ |
| 676 | " | 8 | ↑ |

TABLE V-continued

| Hrs. to Failure | Failed Devices | | |
|---|---|---|---|
|  | 5 | 6 | 7 |
| 812 | 5 | 9 | " |
| 825 | 6 | 9 | ↓ |
| 944 | 6 | 10 | ↓ |
| 970 | 7 |  | ↓ |
| 1218 | 8 |  | ↓ |
| 1419 | " |  | 3 |
| 1466 | 10 |  | " |
| 1545 |  |  | 3 |
| 1939 |  |  | 5 |
| 2284 |  |  | 7 |
| 2405 |  |  | 8 |

The above results show that the devices encapsulated with the compositions of the present invention (5 and 7) containing either the benzopinacol (5), or the benzopinacol plus the brominated novolac (7), far exceeded the performance of (6), the encapsulant of Ser. No. 103,153 containing the copper acetylacetonate cocatalyst.

Although the above examples are directed to only a few of the very many variables which can be used in making the encapsulant compositions of the present invention, it should be understood that the present invention is directed to a much broader variety of heat curable encapsulant compositions as shown in the description preceding these examples.

What is claimed is:

1. A method for making plastic encapsulated electronic devices capable of exceeding a 50% survival rate of at least 100 hours when subjected to a moisture ladened environment at a temperature of about 145° C. under highly accelerated stress test conditions, which comprises encapsulating the electronic devices at a temperature of 120° to 230° C. and at a pressure of 400 to 1500 psi with a heat curable composition comprising by weight,
 (a) 100 parts of an epoxy resin having less than 100 parts per million of hydrolyzable chloride,
 (b) 10 to 1000 parts of fused silica filler,
 (c) a catalytic amount of a compatible monomeric, or polymeric diaryliodoniumhexafluoroantimonate salt, and
 (d) an effective amount of a free-radical generating aromatic compound as a cocatalyst for (c).

* * * * *